(12) United States Patent
Agostani et al.

(10) Patent No.: US 9,197,603 B2
(45) Date of Patent: Nov. 24, 2015

(54) METHOD FOR CONNECTING A FIRST COMPUTER NETWORK TO AT LEAST A SECOND EXTENDED COMPUTER NETWORK

(75) Inventors: Marco Agostani, Rho (IT); Carlo Federico Bolchini, Milan (IT); Matteo Valsasna, Saronno (IT); Joseph Stinson McElhinney, IV, Lugano (CH); Kevin Scott Orr, Nyon (CH); Miguel J. Estupinan, Bissone (CH)

(73) Assignee: Solar Turbines Incorporated, San Diego, CA (US)

( * ) Notice: Subject to any disclaimer, the term of this patent is extended or adjusted under 35 U.S.C. 154(b) by 906 days.

(21) Appl. No.: 13/381,476

(22) PCT Filed: Jul. 1, 2009

(86) PCT No.: PCT/EP2009/058271
§ 371 (c)(1),
(2), (4) Date: Feb. 23, 2012

(87) PCT Pub. No.: WO2011/000421
PCT Pub. Date: Jan. 6, 2011

(65) Prior Publication Data
US 2012/0144188 A1    Jun. 7, 2012

(51) Int. Cl.
*G06F 15/16* (2006.01)
*H04L 29/06* (2006.01)
*H04L 29/12* (2006.01)
*H04L 12/46* (2006.01)

(52) U.S. Cl.
CPC ........ *H04L 63/0272* (2013.01); *H04L 12/4633* (2013.01); *H04L 29/06551* (2013.01); *H04L 29/1233* (2013.01); *H04L 63/164* (2013.01)

(58) Field of Classification Search
CPC ............ H04L 29/1233; H04L 29/1208; H04L 29/12339; H04L 29/06625; H04L 29/12575; H04L 61/25; H04L 61/60; H04L 12/4633
USPC .......................... 709/217, 218; 370/392, 401
See application file for complete search history.

(56) References Cited

U.S. PATENT DOCUMENTS

| | | | |
|---|---|---|---|
| 6,636,516 B1 * | 10/2003 | Yamano | 370/395.52 |
| 8,566,452 B1 * | 10/2013 | Goodwin et al. | 709/227 |
| 2004/0223497 A1 | 11/2004 | Sanderson et al. | |

(Continued)

OTHER PUBLICATIONS

International Search Report from International Application No. PCT/EP2009/058271 dated Apr. 29, 2010.

*Primary Examiner* — Aftab N. Khan
(74) *Attorney, Agent, or Firm* — Procopio, Cory, Hargreaves & Savitch LLP

(57) ABSTRACT

Method for connecting a first computer network and at least a second extended computer network wherein the at least second extended computer network is not connected to the Internet and does not have a routing path to the first computer network, the method comprising: installing a concentration router within an intermediate network and associating the concentration router to a public IP address; interconnecting the intermediate network to the at least second extended computer network through a CPE router, and interconnecting the intermediate network to the first computer network via the Internet passing through the concentration router; implementing an IP tunnel between the at least second extended computer network and the first computer network across the direct intermediate network and the Internet, wherein the IP tunnel is implemented as a first external and encrypted IP tunnel, across the Internet, and a second internal non-encrypted IP tunnel across the intermediate network.

10 Claims, 3 Drawing Sheets

(56) References Cited

U.S. PATENT DOCUMENTS

| | | | |
|---|---|---|---|
| 2006/0031407 A1* | 2/2006 | Dispensa et al. | 709/219 |
| 2006/0059370 A1* | 3/2006 | Asnis et al. | 713/189 |
| 2006/0080462 A1* | 4/2006 | Asnis | 709/238 |
| 2006/0126645 A1* | 6/2006 | Devarapalli et al. | 370/401 |
| 2007/0104197 A1* | 5/2007 | King | 370/392 |
| 2007/0248085 A1* | 10/2007 | Volpano | 370/389 |

* cited by examiner

METHOD FOR CONNECTING A FIRST COMPUTER NETWORK TO AT LEAST A SECOND EXTENDED COMPUTER NETWORK

CROSS-REFERENCE TO RELATED APPLICATIONS

The application is a U.S. Nationalization of International Application No. PCT/EP2009/058271 filed on 1 Jul. 2009, the contents of which are incorporated herein, in their entirety, by this reference.

FIELD OF APPLICATION

The present invention relates to a method for connecting a first computer network to at least a second extended computer network wherein the at least second extended computer network is not connected to the Internet and does not have a routing path to the first computer network, the method providing the step of:

interconnecting an intermediate network to the at least second extended computer network, and the intermediate network to the first computer network via the Internet and implementing an IP tunnel between the first computer network and the at least second extended computer network across the intermediate network and the Internet.

More particularly, the present invention relates to a method of the type described above wherein the first computer network and the second extended computer network belong to same or associated companies, for example having a same legal entity, and the intermediate network belongs to a third party.

PRIOR ART

As it is known, methods for connecting a first computer network and at least a second extended computer network which is not connected to the Internet and does not have a routing path to the first computer network, provide interconnecting an intermediate network to the at least second extended computer network, via a router acting as an IP tunnel terminator, and the intermediate network to the first computer network via the Internet.

In other words, these methods implement an IP tunnel between the first computer network and the at least second extended computer network across a direct routing path and the Internet, i.e. traversing both the Internet and the intermediate network. More particularly, the direct routing path is the path across the intermediate network between the at least second extended computer network and the Internet.

With reference to FIG. 1, the main steps of the above methods are schematically represented, including the interconnection between the first computer network 1 having a connection to the Internet 3, and the second extended computer network 2 not provided with a connection to the Internet 3 but having a connection to the CPE router 9 which is also connected to the intermediate network 5.

For example, the first computer network 1 and the second extended computer network 2 may be, respectively, a connectivity corporate network of a user A and an external connectivity corporate network of the same user A, which cannot be directly connected, since they do not have a direct routing path, nor they can be virtually connected via an IP tunnel through the Internet 3, since the external connectivity corporate network 2 is not provided with an Internet 3 connection, for example due to geographic constraints.

The first computer network and the second extended computer network belong to same or associated companies, for example having a same legal entity.

With reference to the above example, the intermediate network 5 is a connectivity corporate network 5 of a provider B which is connected to the Internet 3 and may provide connectivity to the external connectivity corporate network 2 through a direct routing path, implementing an IP tunnel between the connectivity corporate network of the user A and his respective extended connectivity corporate network. More particularly, the intermediate network 5 or connectivity corporate network 5 belongs to a third party, which is not legally connected to the first computer network 1 and the second extended computer network 2.

The network traffic generated from the first computer network 1 towards the second extended computer network 2, and vice-versa, is encrypted, for example through an IPSec protocol, i.e. a standard for enciphering and authenticating IP packets at network layer, in order to avoid inspection of data transferred into the IP tunnel from third parties. In other words, the enciphering and authentication provide a secure virtual point-to-point connection or secure IP tunnel between the networks of the user A.

A disadvantage of these methods is that encrypting the network traffic to avoid inspection from third parties also avoids inspection within the intermediate network 5, making provider B uncapable of inspecting the network traffic passing through his intermediate network 5 and for which the provider B is responsible.

Another disadvantage of the known methods is apparent when more than one extended computer network 2 are connected to the first computer network 1 over respective IP tunnels passing through the intermediate network 5.

In fact, if IPSec standard is used to implement security over each IP tunnels, the intermediate network 5 of the provider B must provide at least a public IP address for each extended computer network 2, since the IPSec standard requires layering security directly above the IP network layer L3 of the OSI reference model, with the consequence that it is not possible to use the same public IP address for implementing a plurality of secure IP tunnels.

On the other hand, using a different standard for security to allow multiplating several secure IP tunnels using the same public IP address of the intermediate network 5, for example SSL VPN, which is layered above Transport layer L4 and not over IP network layer L3, other problems arise.

In fact, this method would require a non trivial NAT (Network Address Translation) configuration on the intermediate network 5 of the provider B, increasing the complexity of the implementation of the method within the intermediate network 5 and possible future modifications and extensions to further extended computer networks 2.

Again with reference to the above example, the complexity of the implementation of the method also increases in the first computer network 1, since it must be configured to provide one secure IP tunnel per each extended computer network 2.

Moreover, independently from the number of extended computer networks 2 to be connected, the known method require a burdensome inspection of the intermediate network 5 and the first and second extended computer networks 1, 2, and heavy negotiations of IP addressing space between the provider B, the user A, potentially involving third parties C responsible to implement the secure IP tunnel, also indicated as network integration providers. These inspection and negotiations are necessary to avoid overlapping and conflicts of private IP addresses within the intermediate network 5, the first and second computer network 1, 2 and, if overlapping are detected and not avoidable with negotiations, the known methods must be modified to provide NAT (network address translations) among the networks 1, 2, 5.

In other words, when network integration between separate parties is required, i.e. integration between the first computer network, the second extended computer network and the intermediate network parties, each with its own private network administration, technical and political issues of the type described above arise, increasing the complexity and the time required for the integration.

This complexity further increases when the integration is commissioned to another technically specialized party, also indicated as network integration provider, which is charged to implement the IP tunneling comprising the configuration of the routers installed with the intermediate network, the first and second extended network and which is strictly limited by the constraints required by each party.

The technical problem at the base of the present invention is to provide a method which imposes minimal configuration requirements on the intermediate network 5, in terms of network architecture, topology and logical configuration, the method requiring only one public IP address for a plurality of extended computer networks 2 to be connected in secure IP tunneling, allowing the provider B to inspect the network traffic traversing the intermediate network 5, and, at the same time, guaranteeing reciprocal isolation between the intermediate network 5 and the first and second extended computer networks 1, 2, as well avoiding conflicts between private addresses used within the intermediate networks 5 and the networks 1, 2, such method also supporting an incremental provisioning of additional extended computer networks 2 for wider connectivity, and overcoming the drawbacks and limitations that currently affects the prior art methods.

SUMMARY OF THE INVENTION

The solution idea at the base of the present invention is to provide a method for interconnecting a first computer network and at least a second extended computer network not connected to the public Internet, through a pipeline of IP tunnels connected by a concentration router on an intermediate network, wherein a first portion of the pipeline is an encrypted IP tunnel implemented among a secure intermediate network and the first computer network, over the public Internet, and a second portion of the pipeline is a non-encrypted IP tunnel implemented among the secure intermediate network of the provider B and the second extended network.

According to this solution idea, the above technical problem is solved by a method for connecting a first computer network and at least a second extended computer network wherein the at least second extended computer network is not connected to the Internet and does not have a routing path to the first computer network, the method providing the step of:

installing a concentration router on an intermediate network and associating the concentration router to a public IP address;

interconnecting the intermediate network to the at least second extended computer network through a CPE router and interconnecting the intermediate network to the first computer network via the Internet, passing through the concentration router;

implementing an IP tunnel between the at least second extended computer network and the first computer network across the intermediate network and the Internet, wherein said IP tunnel is implemented as a first internal non-encrypted IP tunnel across the intermediate network and as a second external and encrypted IP tunnel across the Internet.

Advantageously, the first portion of the IP tunnel is implemented through a standard protocol, for example GRE, allowing the provider B to inspect the network traffic within the intermediate network, and the second portion of the IP tunnel is secured through another standard protocol, for example IPSec, protecting the communication from third party detection.

Advantageously, one single public IP address is requested to be set in the concentration router within the intermediate network for supporting a plurality of connections between the first computer network and a respective plurality of extended computer networks, through corresponding first portions of non-encrypted IP tunnels and second portions of encrypted IP tunnels.

Advantageously, the method of the present invention solves the technical and political problem arising when network integration between separate parties, i.e. the first computer network, the at least second extended computer network and the intermediate network parties, each with its own private network administration is required.

Further advantages and embodiments of the method according to the present invention are specified in the description below, given at exemplificative purpose and without limiting the scope of protection of the present invention.

DETAILED DESCRIPTION

Figure 1:
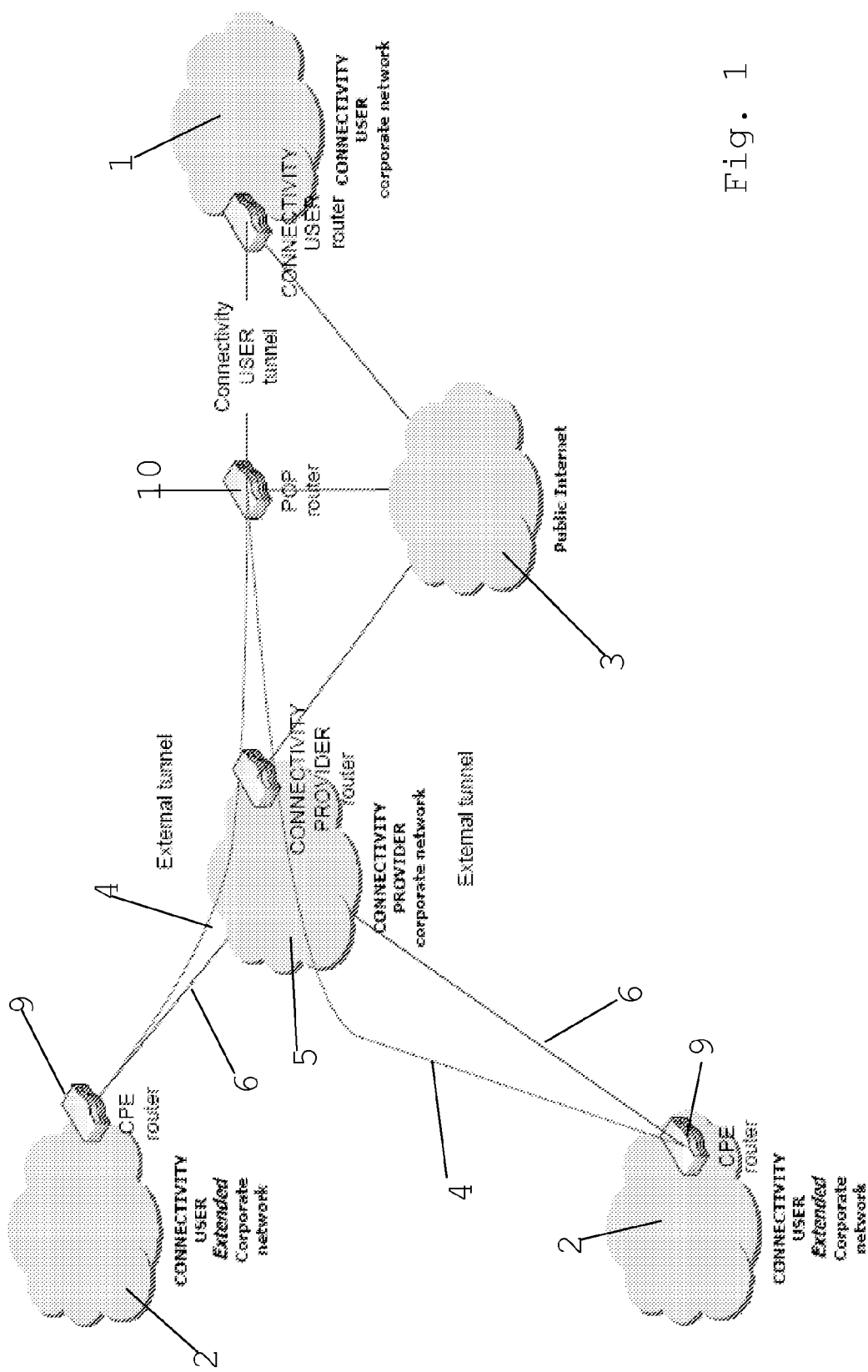
FIG. 1 schematically represents a first computer network and a second extended computer network connected through an intermediate network, according to a prior art method.
Figure 2:
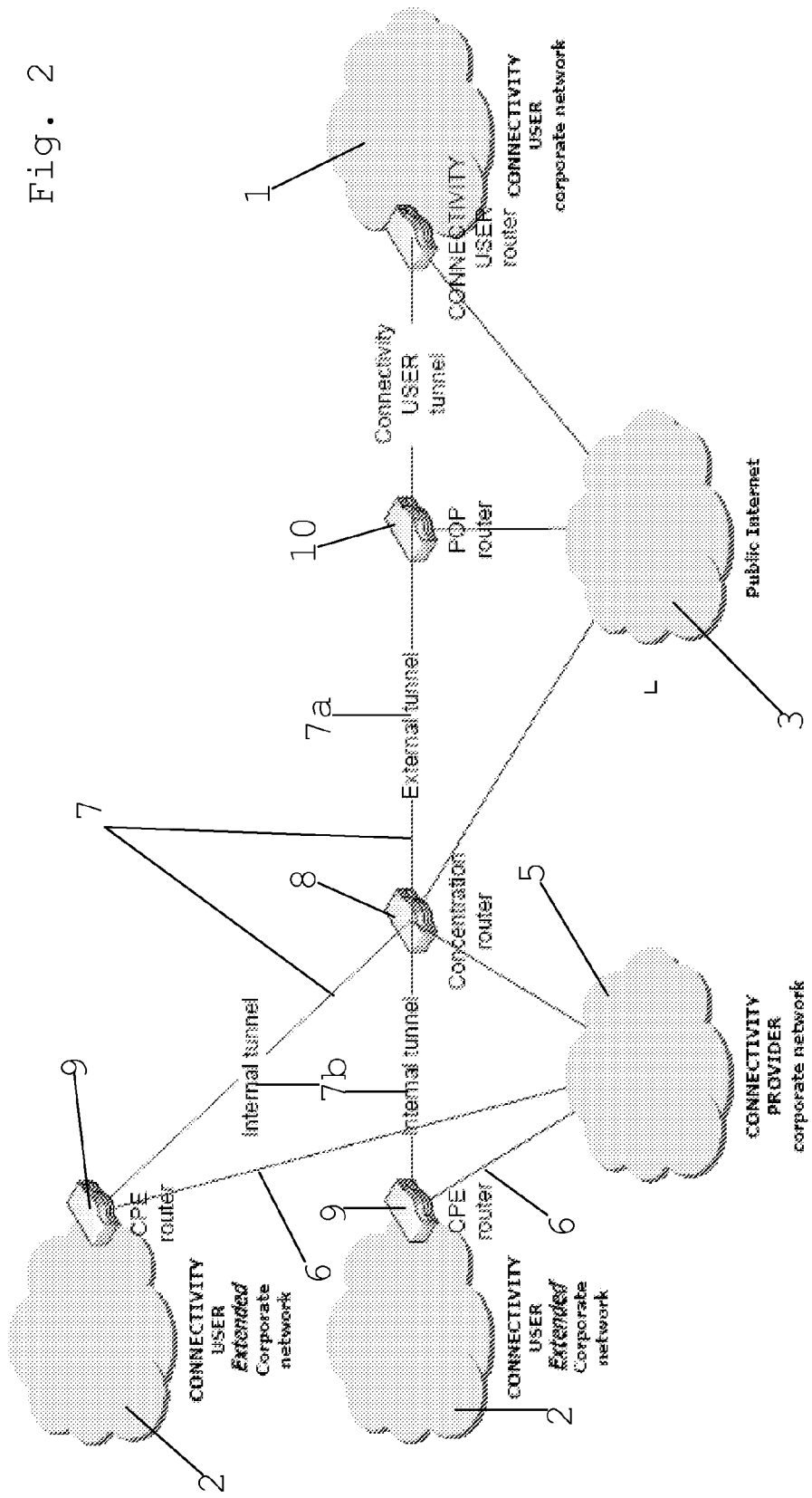
FIG. 2 schematically represents a first computer network and a second extended computer network connected through an intermediate network, according to the method of the present invention.

With reference to FIG. 2, it is schematically represented a method for connecting a first computer network 1 and at least a second extended computer network 2 which is not connected to the Internet 3 and to the first computer network 1.

More particularly, the method provides interconnecting an intermediate network 5 to the at least second extended computer network 2, via a CPE router 9, and the intermediate network 5 to the first computer network 1 via the Internet 3.

The first computer network 1 and the intermediate network 5 are connected through the Internet 3 and via a POP (Point of Presence) router 10 having a public IP address IP1.

Without limiting the scope of protection of the present invention and only for exemplificative purpose, the first computer network 1 and the second extended computer network 2 may be, respectively, a connectivity corporate network of an user A and an external connectivity corporate network of an user A', A and A' belonging to same or associated companies, for example having a same legal entity, and whose networks cannot be directly connected nor they can be virtually connected via an IP tunnel through the Internet 3, because the at least second extended network 2 is not provided with a connection to the Internet 3.

With reference to the above example, the intermediate network 5 may be a connectivity corporate network 5 of a provider B, belonging to a third party not legally connected to the company A or A', which is connected to the Internet 3 and may provide connectivity to the at least second extended network 2 through a direct routing path thereto, supporting the implementation of an IP tunnel between the connectivity corporate network of the user A and the respective extended connectivity corporate network of the user A'.

Of course, the example given above with reference to users A, A' and provider B is not limitative and the first computer network 1, the second extended computer network 2 and the intermediate network 5 may all belong to the same legal entity or to completely different legal entity, requiring connectivity one to the other according to a network topology substantially different from the one represented in FIG. 2.

According to the present invention, the method provides the following phases:

installing a concentration router 8 within the intermediate network 5 and associating the concentration router 8 to a public IP address IP2;

interconnecting the intermediate network 5 to the at least second extended computer network 2 via a CPE router 9 and interconnecting the intermediate network 5 to the first computer network 1 via the Internet 3, passing through the concentration router 8;

implementing an IP tunnel 7 between the at least second extended computer network 2 and the first computer network 1 across the intermediate network 5 and the Internet 3, wherein the IP tunnel 7 comprises a first external and encrypted IP tunnel 7a across the Internet 3 and a second internal non-encrypted IP tunnel 7b across the intermediate network 5.

The implementation of the second internal and non-encrypted IP tunnel 7b comprises configuring the concentration router 8 and a CPE router 9 which connects each second extended computer network 2 to the intermediate network 5.

The implementation of the first internal and encrypted IP tunnel 7a comprises configuring the concentration router 8 and the POP router 10.

More particularly, the configuration of the POP router 10 comprises the step of storing in a routing table 10r of the POP router 10:

at least the public address IP2 of the concentration router 8;

a plurality of private IP addresses, also indicated as external right addresses, to be used as destination addresses in traffic generated from the hosts of the second extended computer network 2 to the first computer network 1, carried within the IP tunnel pipeline 7;

a plurality of private IP addresses, also indicated as external left addresses, to be assigned to hosts of the second extended computer network 2. According to the method of the present invention, in order to avoid conflicts between the external left addresses and the external right addresses and the addresses assigned by provider B to the concentration router 8 and CPE routers 9 on the intermediate network 5, the external left addresses are chosen after provider B has defined all the private IP addresses of the intermediate network 5, including the private IP address of the concentration router 8 and the external private IP address of the CPE routers 9, as will be apparent from the following description. Preferably, the external left addresses are defined by a network integrator provider which is responsible of integrating the first computer network and the second extended computer network implementing the IP tunnels 7a and 7b.

The POP router 10 routes to the concentration router 8 and within the first external and encrypted IP tunnel 7a all the traffic generated from the first computer network 1 to the second extended computer networks 2, and it routes to the first computer network 1 all the traffic received from the concentration router 8 and generated from the second extended computer networks 2.

The configuration of the concentration router 8 comprises the step of storing in a routing table 8r of the concentration router 8:

a private IP address of each CPE router 9 connected to the intermediate network 5, said private IP address of each CPE router 9 being external to the second extended computer network 2;

the public IP address IP1 of the POP router 10;

a plurality of private IP addresses, also indicated as external virtual right addresses, which are substituted to the above referred external right addresses while they transit within the IP tunnels 7a and 7b; more particularly, the substitution of the above referred external right addresses is executed through a NAT translation performed by the CPE routers 9 and reversed by the POP router 10, and vice versa;

a plurality of private IP addresses, also indicated as internal left addresses, to be assigned to hosts of the second extended computer network 2 within the second extended computer network 2 for traffic generated for the IP tunnel pipeline 7.

According to the method of the present invention, in order to avoid conflicts between the external virtual right addresses and the external private IP addresses of the CPE router 9, the former are chosen after that the provider B has defined all the private IP addresses of the intermediate network 5, including the private IP address of the concentration router 8 and the external private IP address of the CPE routers 9. Preferably, also the external virtual right addresses are defined by the network integrator provider.

The concentration router 8 routes to the POP router 10 all the traffic generated from the second extended computer network 2 to the first computer network 1, and it routes to the CPE router(s) 9 all the traffic received from the POP router 10 and generated from the first computer network 1.

The configuration of the CPE router(s) 9 comprises the step of storing in a routing table 9r of the CPE router 9:

a private IP address of the concentration router 8, said private IP address of the concentration router 8 being internal to the intermediate network 5;

the virtual right addresses;

the local left addresses, i.e. private IP addresses assigned to hosts of the second extended computer network 2 within the local network, i.e. within the second extended computer network 2.

In this case, according to the method of the present invention, conflicts between the external virtual right addresses and the internal private IP addresses of the concentration router 8 are avoided choosing the former after the provider B has defined all the private IP addresses of the intermediate network 5, including the private IP address of the concentration router 8 and the external private IP address of the CPE routers 9. Also in this case, the external virtual right addresses are defined by the network integrator provider.

In other words, the method of the present invention advantageously avoids conflicts in private IP addresses executing the steps here below reported:

1 collecting the private IP addresses assigned by the provider B to the intermediate network 5, including the internal private IP address of the concentration router 8 and the external private IP addresses of the CPE router(s) 9;

2 selecting, preferably by the part of the network integrator, external virtual right address that does not conflict with the internal private IP address of the concentration router 8 and the external private IP addresses of the CPE router(s) 9;

3 defining an association or mapping between the external virtual right address and the external right address to be configured on the CPE routers 9 and POP routers 10;

4 selecting left addresses not conflicting with the external right address and the IP addresses assigned to the concentration router 8 and the CPE router(s) 9 on the intermediate network 5.

After the above referred steps 1-4, a further step 5 may be executed to masquerade the internal private IP address of the concentration router 8 and the external private IP addresses of the CPE router(s) 9. Advantageously, the step 5 is executed for the purpose of allowing monitoring and managing the above referred devices from the network integrator, without requiring the network integrator to install routes to the intermediate network 5 IP addresses on its routers, and without requiring the intermediate network 5 to install routes to a network integrator monitoring systems. Step 5 is executed assigning, preferably by the part of the integration provider, private IP addresses, also indicated mgmtaddresses.

Also the mgmtaddresses are selected avoiding conflicts with the concentration router 8 and the external private IP addresses of the CPE router(s) 9.

Here below, with reference to FIG. 2a, it is described an example of execution of the method of the present invention, giving the configuration of the POP router 10, the concentration router 8, the CPE router 9, as well as the respective IP subnets of the networks 1, 2, 3, to be connected, and indicating, when and by whom (provider B or integration provider) such devices are configured.

The IP subnet(s) assigned to the first computer network 1 are assessed.

Figure 2A:
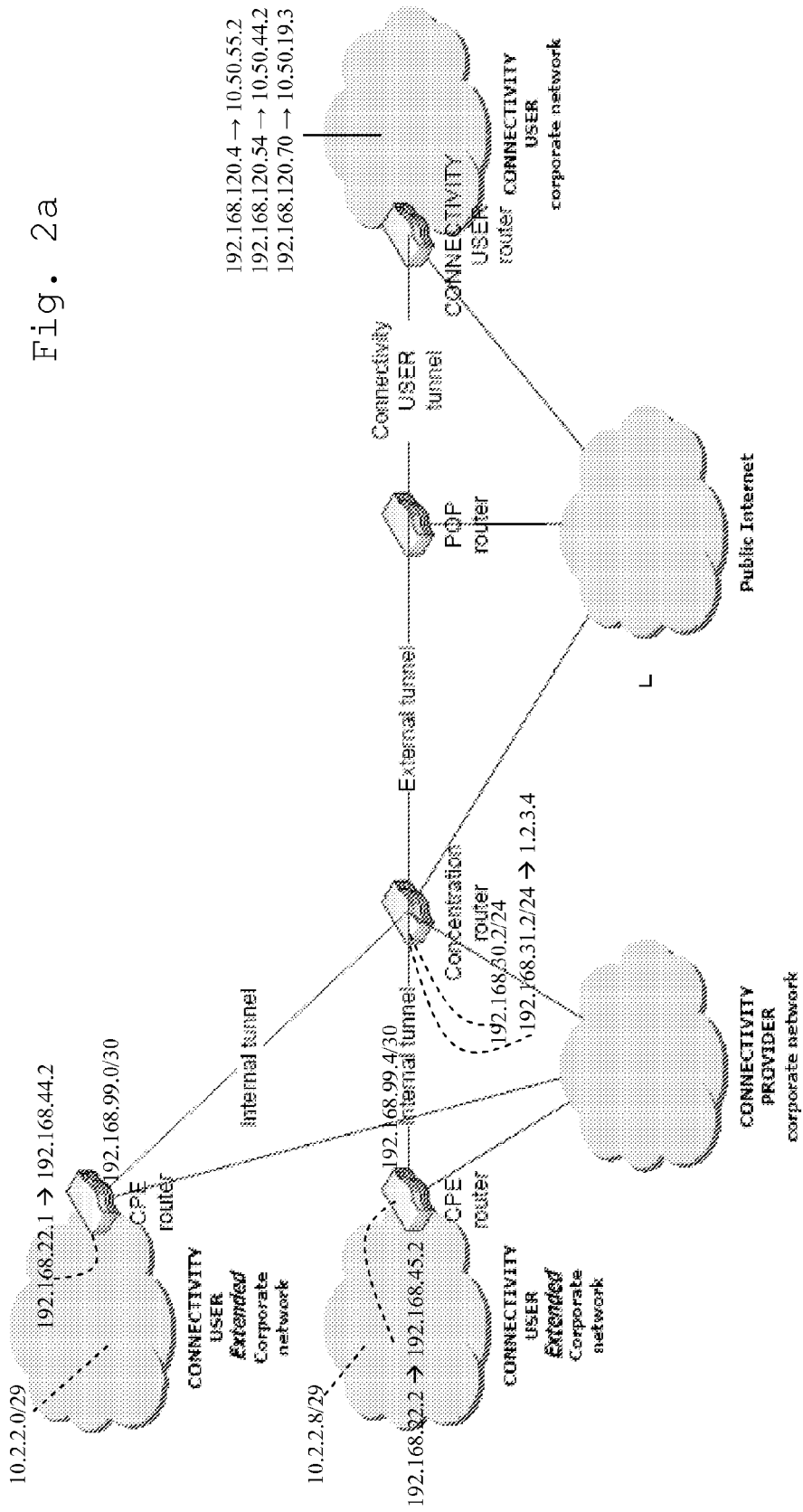
FIG. 2*a* schematically represents in a different view the first computer network and the second extended computer network connected through the intermediate network of FIG. 2.

As schematically represented in FIG. 2a, the hosts of the first computer network 1 are configured with an IP subnet 10.50.0.0/16 which has been assigned by the corresponding network administrator having, for example, private IP addresses 10.50.55.2, 10.50.44.2, 10.50.19.3.

The private IP address with a respective IP subnet, indicated above as internal private IP address of the concentration router 8, is assigned to the concentration router 8 within the intermediate network 5 for implementing an endpoint of the second internal and non-encrypted IP tunnel 7b, for example with IP subnet 192.168.30.2/24 different from the IP subnet 10.50.0.0/16 assigned to the first computer network 1.

The internal private IP address of the concentration router 8 is assigned by the provider B of the intermediate network 5 and is assigned before the network integrator selects private IP addresses for implementing the IP tunnels. Advantageously, no constrains are imposed on the provider B because he is free of assigning any private IP address to the concentration router 8, without the risk of conflicts.

If a NAT is applied between an external address of the concentration router 8 and the corresponding public IP address IP2, for example translating from 192.168.31.2/24 to the public IP address IP2 1.2.3.4, also the external address of the concentration router is assigned by the provider B.

The provider B also selects private IP address(es) for each CPE router(s) 9 within the intermediate network 5, also indicated as external private address of the CPE router(s) 9, corresponding to another endpoint of the second internal and non-encrypted IP tunnel 7b. For example, considering two CPE router(s) for corresponding second extended computer networks 2, IPs with IP subnet 192.168.44.2/24, 192.168.45.2/24 are assigned, which are different from the IP subnets 10.50.0.0/16, 192.168.30.2/24 respectively assigned to the first computer network 1 and to the internal address of the concentration router 8.

Furthermore, the provider B also assigns the IP subnets to be used for the internal tunnel interfaces to be set on the CPE routers 9 and the concentration router 8, i.e. 192.168.99.0/30, 192.168.99.4/30.

Thus, all the configuration required to the provider B to implement the IP tunneling may be substantially chosen and decided by the provider B itself, which is not constrained by limitations or rules intended to avoid conflicts with the other networks 1, 2.

According to the method of the present invention, only after the provider B has chosen and specified the above configurations, the following IP addresses are established, preferably by one single part, i.e. the network integration provider.

The network integrator further assigns mgmtaddresses, which correspond to the private IP addresses specified by the provider B, i.e. the IP addresses of the CPE router 9, in order to masquerade such private IP addresses. The mgmtaddresses are assigned by the network integrator, after the provider B selection of IP addresses above referred. Here below is reported an example of this step of assigning mgmtaddresses to masquerade the CPE routers 9 external private addresses:

192.168.22.1→192.168.44.2
192.168.22.2→192.168.45.2

Private IP addresses, also referred as internal left addresses, are assigned to hosts on the second extended computer network 2 by the network integrator, for example, considering two extended computer networks 2, 10.2.2.0/29 and 10.2.2.8/29

The network integrator further assign private IP addresses, also referred as external right addresses, that are used as destination addresses in traffic generated from the hosts of the second extended computer network 2, including the IP addresses of the first computer network 1, 10.50.0.0/16. These addresses eventually include IP addresses of servers used by the network integration provider to monitor the network operation or other services, for example the IP address 192.168.20.0/24.

With reference to FIG. 2a, the right addresses are indicated with 10.50.0.0/16 and 192.168.20.0/24, the left addresses with 10.2.2.[0,8]/29 and the mgmtaddresses with 192.168.22.x.

Private IP addresses, also indicated as external virtual right addresses, which are substituted to the right addresses while they transit IP tunnels 7a and 7b, are assigned by the network integrator after the provider B has assigned the above referred private IP addresses.

Here below is reported an example of IP addresses from the second extended computer network through the IP tunnel pipeline 7 and to the first computer network.

10.50.0.0/16→10.90.0.0/16→10.50.0.0/16
192.168.20.0/24→10.91.0.0/24→192.168.20.0/24

Here below, according to an aspect of the present invention, Network Address Translations provided by the CPE routers 9, POP router 10 and concentration router 8 to deliver network traffic are briefly described.

The external right addresses are translated to the external virtual right addresses while they traverse the IP tunnel 7, by means of source and destination NAT configurations on the CPE routers 9 and POP router 10. More particularly, the method according to the invention comprises executing a source and destination NAT configurations on the CPE routers 9 and POP router 10 to translate the external right addresses into the external virtual right addresses, when the network traffic traverse the IP tunnel 7.

The source and destination NAT configurations on the CPE routers 9 are inverted by those on the POP router 10, and vice versa. More particularly, the method of the invention provides comprises executing a source and destination NAT configurations on the POP router 10, providing an inverted translation which translate the external virtual right addresses into the external right addresses, when the network traffic exits the IP tunnel 7.

Management traffic from the network integrator can reach the CPE routers 9 external private IP addresses using different addresses, i.e. the mgmtaddressed, by means of destination NAT configurations on the concentration router 8, thus avoiding the need to install routes to the intermediate network 5 in the POP router 10. More particularly, the method provides executing a destination NAT configuration on the concentration router 8 including a definition of mgmtaddresses whereto network traffic generated by the network integrator and directed to the CPE routers 9 is addressed. The mgmtaddresses are different from the external private IP addresses of the CPE routers 9, in order to avoid installing routes to the intermediate network 5 in the POP router 10.

The network integrator is connected to the first computer network 1 to manage the traffic.

The network traffic generated by the network integrator reach the CPE routers 9 external private IP addresses with the source address translated to the concentration router 8 internal private address, by means of a source NAT configuration on the concentration router 8, thus avoiding the need to install routes to the integration provider's management system in the intermediate network 5 routers. More particularly, the method comprises executing a source NAT configuration on the concentration router 8 including a translation of the source address of traffic generated for the CPE routers 9 by the network integrator into the internal private address of the concentration router 8, in order to avoid installing routes to the integration provider in routers of the intermediate network 5.

According to an aspect of the present invention, the first portion of the IP tunnel 7a is implemented through a standard protocol, for example GRE, allowing the provider B to inspect the network traffic within the intermediate network, and the second portion of the IP tunnel 7b is secured through another standard protocol, for example IPSec, protecting the communication from third party detection.

Advantageously, according to the method of the present invention, minimal requirements are imposed on the intermediate network 5, in terms of network architecture, topology, logical configuration and conflicts between private internet IPv4 addresses (RFC1918) of the intermediate network and of the first computer network and second extended computer network are avoided.

Advantageously, the method allows the provider B to inspect the network traffic traversing the intermediate network, thus abiding with security policies of the provider and, at the same time, guarantees reciprocal isolation between the intermediate network 5 of the provider B and the networks 1, 2 of the user A though means of policy routing and access lists to guarantee such isolation.

Thus, the method enables the provider B to enforce security and QoS restrictions on the traffic carried by the intermediate network 5.

Advantageously, the method require only one public IP address from at the provider's B side, regardless of the number of extended computer network 2 connected to the first computer network 1 of the user A, allowing incremental provisioning of further extended computer network 2 without the addition of public IP addresses.

Advantageously, the method according to the present invention can be adapted to a wide set of network configurations, lowering per-project design costs, and requiring less skilled technical personnel to perform the negotiations with different providers B.

The invention claimed is:

1. A method for interconnecting a first computer network and at least one second extended computer network, wherein the at least one second extended computer network is not connected to the Internet, the method comprising:
    interconnecting the at least one second extended computer network to an intermediate network though a CPE router, and
    interconnecting the intermediate network to the Internet via a concentration router;
    interconnecting the first computer network to the Internet via a Point of Presence (POP) router; and
    implementing an Internet Protocol (IP) tunnel between the at least one second extended computer network and the first computer network across the intermediate network and the Internet, wherein the IP tunnel comprises a first internal non-encrypted IP tunnel portion across the intermediate network between the CPE router and the concentration router, and a second external and encrypted IP tunnel portion across the Internet between the concentration router and the POP router,
    wherein, for traffic transmitted from the at least one second extended computer network to the first computer network,
    the CPE router substitutes right addresses, used as destination addresses for traffic generated by hosts within the second extended computer network to hosts within the first computer network, with virtual right addresses, and
    the POP router substitutes the virtual right addresses with the right addresses, such that traffic transmitted from the at least one second extended computer network to the first computer network over the intermediate network is inspectable by a provider of the intermediate network, but with reciprocal isolation between the intermediate network and the first and second extended computer networks,
    wherein the CPE router stores a routing table that comprises a private address of the concentration router within the immediate network, the virtual right addresses, and internal left addresses, and wherein the method further comprises a set-up phase comprising collecting private IP addresses assigned to the intermediate network including private IP addresses of the concentration router and the CPE router, and choosing and configuring virtual left addresses and the virtual right addresses in the POP router and CPE router to be different from the collected private IP addresses to avoid IP address conflicts among the intermediate network, the first computer network, and the at least one second extended computer network.

2. The method according to claim 1, wherein the substitution of right addresses with virtual right addresses by the CPE router and the substitution of virtual right address with right addresses by the POP router are performed by network address translation.

3. The method according to claim 1, wherein the POP router stores a routing table that comprises: at least a public address of the concentration router; the right addresses; and external left addresses assigned to hosts of the second extended computer network.

4. The method according to claim 3, wherein the concentration router stores a routing table that comprises:
an external private IP address of the CPE router within the intermediate network; and a public IP address of the POP router.

5. The method according to claim 4, further comprising executing a destination network address translation (NAT) configuration on the concentration router including a definition of a management IP address for network traffic generated for the CPE router by a network integrator, wherein the management IP address is different from the external private IP address of the CPE router, whereby a step of installing routes to the intermediate network in the POP router is avoided.

6. The method according to claim 5, wherein the network integrator is connected to the first computer network.

7. The method according to claim 6, further comprising executing a source NAT configuration on the concentration router including a translation of the source address of traffic generated for the CPE router by the network integrator into an internal private address of the concentration router.

8. The method according to claim 1, wherein the private address of the concentration router and the private IP address of the CPE router within the intermediate network are chosen by an administrator of the intermediate network.

9. The method according to claim 8, wherein the private address of the concentration router and the private IP address of the CPE router within the intermediate network are chosen before the virtual right addresses and the external left addresses.

10. A method for interconnecting a first computer network and two or more second extended computer networks, wherein the two or more second extended computer networks are not connected to the Internet and do not have a routing path to the first computer network, the method comprising:
interconnecting each of the two or more second extended computer networks to an intermediate network though a respective CPE router, each CPE router configured to connect a respective second extended computer network to the intermediate network;
interconnecting the intermediate network to the Internet via a concentration router; and
implementing an Internet Protocol (IP) tunnel between each of the two or more second extended computer networks and the first computer network across the intermediate network and the Internet, wherein the IP tunnel comprises a plurality of first internal non-encrypted IP tunnel portions across the intermediate network between the respective CPE routers and the concentration router, and a second external and encrypted IP tunnel portion across the Internet between the concentration router and the POP router, wherein, for traffic transmitted from each of the two or more second extended computer networks,
each respective CPE router substitutes right addresses, used as destination addresses for traffic generated by hosts within its respective second extended computer network to hosts within the first computer network, with virtual right addresses, and
the POP router substitutes the virtual right addresses with the right addresses,
such that traffic transmitted from the two or more second extended computer networks to the first computer network over the intermediate network is inspectable by a provider of the intermediate network, but with reciprocal isolation between the intermediate network and the first and second extended computer networks,
wherein each CPE router stores a routing table that comprises a private address of the concentration router within the immediate network, the virtual right addresses, and internal left addresses, and
wherein the method further comprises a set-up phase comprising
collecting private IP addresses assigned to the intermediate network including private IP addresses of the concentration router and each CPE router, and
choosing and configuring virtual left addresses and the virtual right addresses in the POP router and each CPE router to be different from the collected private IP addresses to avoid IP address conflicts among the intermediate network, the first computer network, and the two or more second extended computer networks.

* * * * *